United States Patent Office 3,035,902
Patented May 22, 1962

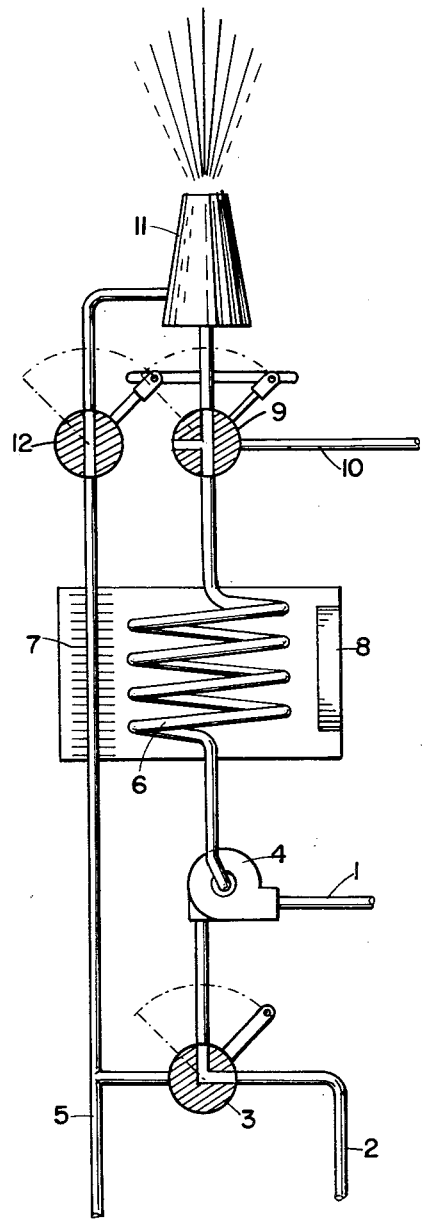

3,035,902
APPARATUS FOR PRODUCING AND CONDITIONING CHEMICAL MIXTURES
Rainer Kurz, Olgastrasse 6, Stuttgart-Stammheim, Germany
Original application Apr. 5, 1957, Ser. No. 651,109. Divided and this application Feb. 6, 1958, Ser. No. 718,104
Claims priority, application Germany Apr. 6, 1956
2 Claims. (Cl. 23—252)

This application is a divisional application of U.S. Serial No. 651,109, now abandoned. This invention relates to liquid chemical compositions and mixtures of the kind which are adapted to harden after a predetermined period, for example, after having been applied to a base material, and is particularly concerned with coating compositions such as lacquers and varnishes and apparatus for preparing, conditioning and applying such compositions or mixtures.

While the invention is generally concerned with chemical compositions of mixtures of the kind referred to, the invention will be described and explained in the following with particular reference to so called "reaction lacquers" or "reaction varnishes," that is, lacquers or varnishes comprising a mixture of at least two components which latter chemically react with each other, usually under development of exothermic heat, to form a hardened material or protective coating. Such mixtures will hereinafter be referred to as "reaction mixtures."

It is common practice that the components of such liquid reaction mixtures, which are adapted to form hard protective coatings, are mixed in a predetermined ratio in a pot or container prior to being applied to the base material, whereafter the liquid reaction mixture has to be worked up within a predetermined time period. It is of course, most essential that the liquid reaction mixture obtained after mixing the components is worked up and applied to the base material in liquid state, i.e., prior to the complete hardening of the reaction mixture. This time period within which the liquid reaction mixture has to be worked up and applied to the base material, is usually referred to as "pot time."

With a view to extending the "pot time" of the liquid reaction mixture, it is customary to admix the reaction mixture with solvents, whereby, however, the reaction mixture becomes rather diluted. This in turn makes it difficult to obtain a thick coat on the base material. In any case, the addition of the solvents makes it rather impossible to obtain thick coats with one single application or working step. Further, the hardening time of the coating composition or reaction mixture is prolonged due to the presence of the solvents which first have to evaporate after the reaction mixture has been applied to the base material.

A further drawback of customary methods for the preparation and application of reaction mixtures resides in the fact that normally the hardening of the reaction mixture after its application to the base material is very slow at low temperatures. In some cases the reaction mixture does not harden at all. If on the other hand, chemical components are added to the reaction mixture with a view to inducing the hardening, i.e., if one adds components having a high hardening activity, then this may result in a drastically reduced "pot time," so that the working up of the reaction mixture and the applying of the reaction mixture onto the base material has to be effected within a very short time.

It is an object of this invention to provide an apparatus by means of which the "pot time" of the reaction mixtures or reaction lacquers can be conditioned, and by which the drawbacks above referred to may be overcome.

The invention is based on the consideration that the reaction mixture should be applied to the base material on the one hand at a time at which the reaction mixture has already hardened to such an extent that the final hardening to obtain the finished coat is rather short and on the other hand at a time at which it is still sufficiently viscous so as to enable an easy application.

In accordance with this invention, the components of the reaction mixture are mixed prior to being worked up or applied to the base material and are thereafter, prior to hardening, subjected to a temperature conditioning treatment which is carefully controlled with regard to time and temperature.

By subjecting the reaction mixture prior to its hardening and prior to its application to the base material to such conditioning treatment, the "pot time" can be considerably prolonged, while the hardening time of the reaction mixture after its application onto the base material may be considerably shortened. In carrying out the conditioning treatment it is very important to carefully control and choose the treatment time and temperature. These two factors, that is, the time and temperatures of the conditioning obviously will have to be varied in accordance with the nature of the components of the reaction mixture.

The conditioning treatment results in the further advantage that a favorable degree of viscosity of the reaction mixture prior to its application onto a base material can be obtained. This is very important since for various purposes, different viscosities are sometimes desired or required.

In accordance with this invention, it has further been ascertained that the final hardening of the reaction mixture, after its application onto the base material can be effected at low temperatures, if the preceding conditioning treatment has lasted sufficiently long. If the reaction between the components of the reaction mixture has progressed to a stage which is near the end of the reaction, then, it has been found, the final hardening will successfully take place at relatively low temperatures. Thus, it has been found that a reaction mixture which did not harden at zero degree centigrade without being subjected to an inventive conditioning treatment, did harden within three hours at this temperature, if subjected to a preceding conditioning treatment.

In this connection, it is pointed out that the term "conditioning treatment" as used in this application covers both heating and cooling of the reaction mixture. In other words, the reaction between the components of the reaction mixture might be conditioned by either heating or cooling the reaction mixture, or the mixture may first be heated and then cooled. This will depend on the nature of the reactants. It will be readily understood that in some cases the reaction between the components might be so vigorous that the "pot time" or hardening time of the mixture is very short. Thus, in order to prolong the "pot time" and thus the hardening time, it will be required to slow down the reaction velocity between the components.

The inventive apparatus will be more fully understood from the following description and drawing which is a somewhat diagrammatical view of a preferred embodiment thereof.

Referring now to the drawing, the apparatus here illustrated comprises a supply line 1 which connects a storage container (not shown) to this mixing chamber or valve 4. A second supply line 2 connects a second storage container (not shown) to this mixing chamber or valve 4. A three-way cock 3 is fitted in the line 2. A coil-shaped pipe 6 connects the mixing chamber 4 to ejecting means in the form of a spraying nozzle 11. The coil-shaped pipe 6 is housed in a casing which is provided with a thermostatically controlled heating element 8. A further three-way cock 9 is connected in line 6 at the outlet end thereof. A pipe 5 connects the nozzle 11 to a supply of compressed air (not shown). The line 5 for conducting compressed air to the nozzle 11 is in heat exchanging contact with the casing through heat exchanger 7. The heat exchanger 7 is provided on the casing for facilitating heat exchange between the casing and the line 5. A further cock 12 is operatively connected in line 5 to control flow from line 5 to the three-way cock 9. A return pipe 10 connects the outlet side of the coiled pipe 6 to the first mentioned storage container (not shown). The flow through the return pipe 10 is controlled by the three-way cock 9.

The apparatus shown in the drawing is adapted for conditioning reaction or coating mixtures or the like, comprising two components. The operation of the apparatus is as follows. The two components of this reaction mixture are separately supplied to the mixing chamber 4 through lines 1 and 2, respectively. Under certain circumstances, the components, which are supplied through the lines 1 and 2 may be pre-heated. This depends on the nature of the particular components. The components are mixed in chamber 4 and the mixture is then fed to the coiled pipe 6 which acts as a delaying means or receiver in which the reaction between the components of the mixture takes place. The pipe 6, as previously pointed out, is accommodated within the casing which is provided with the thermostatically controlled heating element 8. The temperature within the casing and thus within the coiled pipe 6 can thus be carefully controlled. Further, the coiled pipe has a definite length and a definite diameter. The length of pipe 6 and the throughput velocity through this pipe determine the speed of the reaction between the components of the reaction mixture fed from mixing chamber 4. The mixture finally reaches the nozzle 11 through which it is sprayed onto the base material (not shown). It will be realized that the mixture might be sprayed through the nozzle 11 directly onto a base material, or, if desired, the mixture first may be supplied to an intermediate container or vessel from which the mixture is then taken in order to be applied onto the base material.

The spraying, that is the discharge of the reaction mixture from the nozzle 11 should preferably be intermittent. During the intermissions, a further amount of one of the components of the mixture may then be supplied through supply line 1 or 2 and into the coiled pipe 6. This component flows through the three-way cock 9 and the return line 10 back into the storage container (not shown) from which the component originally was taken. The reason for this last mentioned measure is the following: Since at any given moment a certain amount of mixture will remain in the coiled pipe 6, it is necessary to apply measures to prevent the hardening of this mixture in the coiled pipe 6. If now a further amount of one of the components is fed through one of the supply lines during the intermissions of the spraying process, the ratio between the two components in the coiled pipe 6, will be altered, so as to prevent undesired hardening therein.

At the end of the spraying process, it is also possible to accomplish a separation of the components in the mixing chamber or nozzle 4 thereby that air is blown into the system through the three-way cock 3.

If the spraying process takes a rather long time, the coiled pipe will be heated to a temperature by the reaction mixture, which temperature is in excess to that of the starting temperature. This in turn results in a shortening of the hardening time and might thus lead to the hardening of the reacting mixture within the system. In order to counteract this possibility and to reduce undesired temperature increase in the system, it is of course possible to cool the coiled pipe 6. However, it should be pointed out that such cooling should only be effected if the reaction mixture is within the coiled pipe 6. It will be observed that the further line 5, previously referred to, is provided, which line 5 is in heat exchanging contact with the casing through the heat exchanger 7. The line 5 serves primarily the purpose to conduct compressed air to the nozzle 11 which compressed air is used for effecting the spraying. By properly adjusting the three-way cock 9 and the cock or valve 12, this compressed air might also be used to cool the mixture within the coiled pipe 6. Thus, when air passes through line 5, a certain amount of heat will be dissipated from the casing housing pipe 6 by means of the heat exchanger 7.

In order to obtain faultless functioning of the apparatus shown in the drawing, it is advantageous to actuate the two-way cock 3 and the three-way cock 9, which latter is coupled with the cock 12 in the air line 5, in a predetermined time sequence. This may be done in automatic manner thereby that the cocks are controlled and actuated by means of a timing device i.e., time switch (not shown) or the like. This timing device (not shown) may advantageously be driven or actuated by a turbine which works on compressed air.

I have described preferred embodiments of my invention, but it should be understood that this disclosure is for the purpose of illustration, and that various omissions and changes in shape, proportion arrangements of parts, as well as the substitution of equivalent elements for the arrangements shown and described may be made without departing in any way from the scope and spirit of the invention as recited in the appended claims.

I claim:

1. An apparatus for preparing and conditioning a liquid chemical mixture which is adapted to harden after discharge from said apparatus, comprising in combination: mixing means for preparing said chemical mixture therein, conveying means leading to said mixing means and including at least two supply lines adapted separately to conduct at least two reactive components to said mixing means, a first air line operatively connected to one of said supply lines for blowing air therethrough when it is desired to empty the supply line of said component, first valve means arranged between said first air line and said one supply line for alternatively connecting and disconnecting said air line and said supply line, a casing, a coiled pipe at least partly accommodated in said casing and having its inlet side operatively connected with said mixing means for admitting said mixture thereto, adjustable heating means arranged in said casing for controlling the temperature of said mixture in said coiled pipe so as to influence the final hardening time of said mixture, ejecting means situated at the outlet side of said coiled pipe, a return line operatively connected to the outlet side of said coiled pipe and to at least one of said supply lines, when it is desired to pass one reaction component out of said coil and back to its supply line, second valve means for controlling flow through said return line, a second air line for supplying compressed air to said ejecting means, and valve-controlled connecting means for connecting said second air line to the outlet side of said coiled pipe.

2. In an apparatus as claimed in claim 1, heat exchanger means provided between said casing and said second air line for conditioning the temperature of and in said coiled pipe.

References Cited in the file of this patent

UNITED STATES PATENTS

| | | |
|---|---|---|
| 2,511,626 | Einbecker | June 13, 1950 |
| 2,513,081 | Clark | June 27, 1950 |
| 2,579,357 | Arvedlund | Dec. 18, 1951 |
| 2,764,565 | Hoppe et al. | Sept. 25, 1956 |
| 2,779,689 | Reis | Jan. 29, 1957 |